April 5, 1960     C. BEAR     2,931,450
TANDEM VEHICLE CONSTRUCTION
Filed Aug. 2, 1956
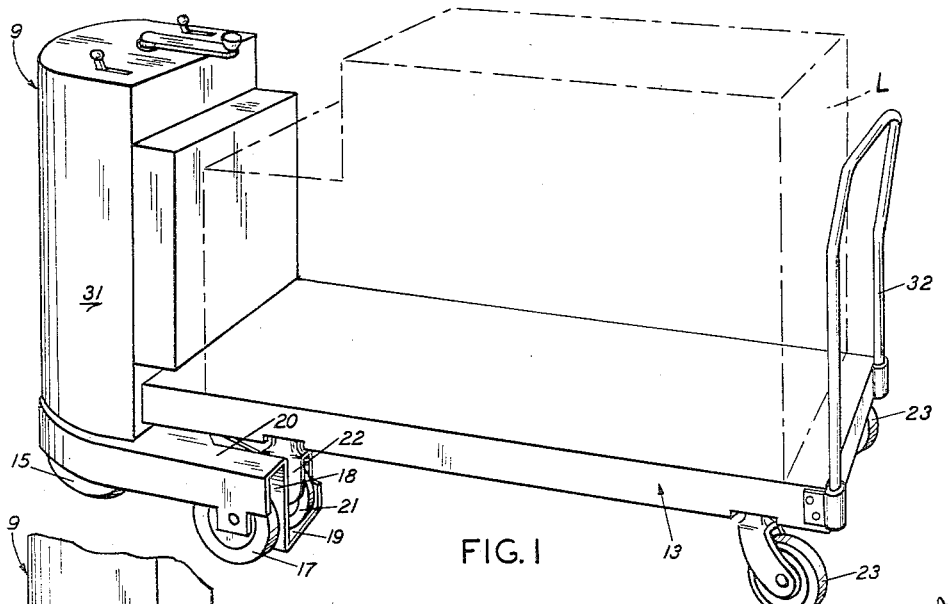
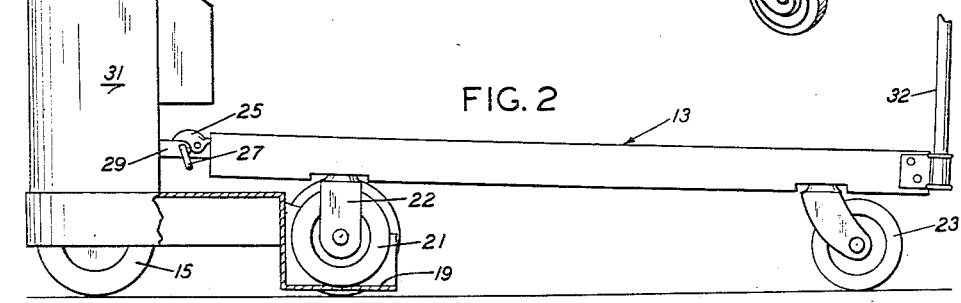
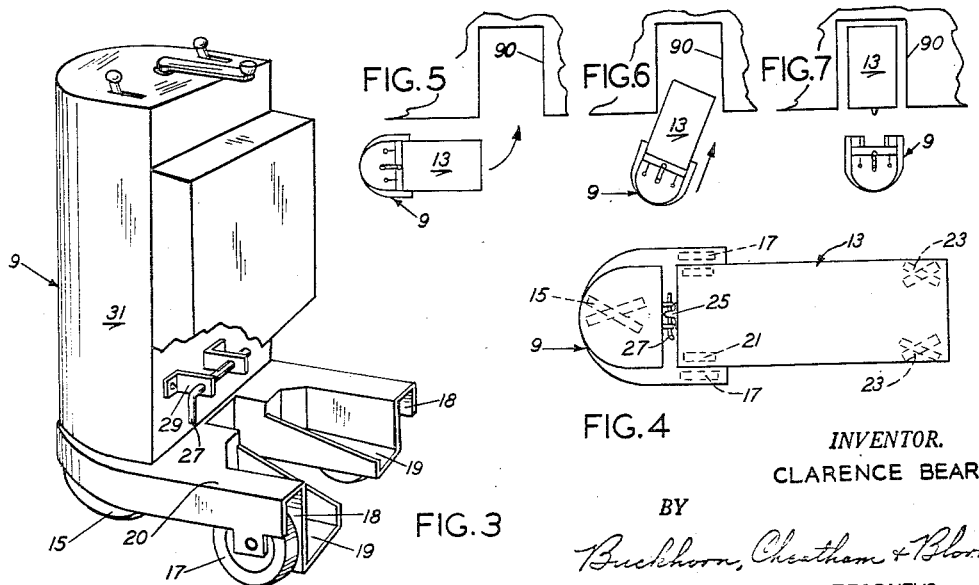
INVENTOR.
CLARENCE BEAR
BY
Buckhorn, Cheatham & Blore
ATTORNEYS

United States Patent Office 2,931,450
Patented Apr. 5, 1960

2,931,450

TANDEM VEHICLE CONSTRUCTION

Clarence Bear, Portland, Oreg.

Application August 2, 1956, Serial No. 601,811

4 Claims. (Cl. 180—14)

This invention relates to vehicles and particularly to a vehicle combination including a towing vehicle and a towed vehicle so interconnected to one another that the towed vehicle can be spotted or parked in a confined space.

Heretofore, it has been common practice in warehouses and other places to transport loads on platform trucks of the type having at one end a set of caster wheels and at the opposite end a set of wheels rotatable about fixed axes. The truck conventionally is pulled by a tractor by the caster wheel end thereof so that the truck will readily follow the tractor. This tractor-truck combination is satisfactory for many purposes but is not very satisfactory when it is desired to back up to spot the truck in a dead end or blind end passage or place, such as is desirable in certain establishments such as cold storage plants. The reason for this is that it is inherently a difficult task to accurately control the movements of a trailer of this type because the trailer tends to turn in the opposite direction from that which the tractor is turned. Thus valuable time is lost attempting to maneuver a platform truck into such a place.

It is a main object of the present invention to provide a vehicle combination including a platform truck of the type under consideration and a tractor which are so connected together that the operator has accurate control over the direction of movement of the truck when the combination is being driven in reverse as well as forwardly, thus to facilitate ready spotting of the truck in dead end or blind end places.

It is a more particular object of the present invention to provide a vehicle arrangement wherein the fixed axis wheels of the platform truck instead of being disposed remotely from the tractor are disposed next to and, in fact, carried by the tractor in a manner such that the truck can be maneuvered in a manner not heretofore possible to obtain ready spotting of the truck in dead end places.

A further object of the invention is to provide an improved industrial tractor especially suited for hauling platform trucks.

Various other objects of the present invention will be apparent from the following description taken in connection with the accompanying drawings, wherein:

Fig. 1 is a perspective view generally from the side of a vehicle combination embodying the concepts of the present invention;

Fig. 2 is a side view with parts broken away showing more fully certain details of construction;

Fig. 3 is a perspective view of the tractor;

Fig. 4 is a schematic plan view of the vehicle combination of the present invention; and Figs. 5, 6 and 7 are schematic plan views illustrating various stages in the operation of the vehicle combination.

Referring to the accompanying drawings, the vehicle combination includes an industrial tractor 9 hitched to a trailer 13 which assumes the form of a platform truck.

The tractor 9 includes at the front end thereof a steerable wheel means in the form of a driven dirigible wheel 15 of conventional construction and at the rear end thereof non-steerable wheel means in the form of a pair of laterally spaced wheels 17 rotatable about fixed axes. The rear wheels 17 are disposed in wells 18 on the tractor frame in flanking or straddling positions with respect to a pair of spaced wheel rest portions 19 on the frame. The wells provide foot rest portions 20 for the driver of the truck.

The platform truck 13 includes fixed axis wheel means at one end thereof in the form of a pair of wheels 21 supported by fixed wheel mountings 22, and caster wheel means at the opposite end in the form of a pair of caster wheels 23. The left-hand end of the truck, as the parts are shown in Fig. 2, is coupled to the tractor 9 by a female jaw type hitch 25 which engages a pin 27 on the tractor. The pin is slidably received within a pair of spaced apart ears 29 which straddle the jaw coupling 25 and are secured to the motor housing 31 of the tractor. The truck has a push bar 32 at the caster end thereof.

As is clearly shown in the drawings, the fixed axis wheels 21 of the truck 13 rest on and are supported by the wheel rest portions 19 of the tractor, with the axles of the wheels 21 being disposed approximately even with the axles of the wheels 17 with respect to the length of the tractor. This means that the load on the truck will not tend to tilt the tractor rearwardly, as it would tend to do were the wheels 21 located rearwardly of the wheels 17.

It is pointed out that the wheel rest portions 19 are disposed just above ground level and substantially below the axes of rotation of wheels 21. Thus the truck can merely be shoved toward the tractor to bump the wheels 21 up and onto the wheel rest portions 19. During such movement the female jaw hitch 25 will of course be open so that it properly engages the pin 27.

Referring to Fig. 2, it will be noted that the tractor is very short, and in fact its overall length is substantially less than the wheel base of the truck. Also, the truck platform overlaps approximately one-half the tractor body. Hence the vehicle combination is only slightly longer than the platform truck itself, and this makes for ready maneuvering in narrow aisles and passages. However, the feature that makes for accurate and easy control over the direction of movement of the truck 13 is the support of the fixed axis wheels 21 of the platform truck on the tractor body. By this construction, the vehicle combination operates like a single vehicle with both vehicles swinging or pivoting about the non-steerable wheels 17 upon operation of the steerable wheel 15. Thus the platform truck follows the movement of the tractor, whether it is moving forwardly or rearwardly, and thus the pallet may readily be spotted in a dead end space 90 as shown in Figs. 5 through 7. A load L is shown on the platform truck in Fig. 1.

Having described the invention in what is considered to be the preferred embodiment thereof, it is desired that it be understood that the invention is not to be limited other than by the provisions of the following claims.

I claim:

1. In combination, an industrial tractor having steerable wheel means at the front end thereof and non-steerable wheel means at the rear end thereof, a trailer having fixed axis wheel means at one end thereof and caster wheel means at the opposite end thereof, coupling means detachably connecting the rear end of said tractor to said one end of said trailer, and platform means on said tractor for engaging the bottom surfaces of said fixed axis wheel means for supporting said fixed axis wheels off the floor so that said tractor and trailer operate as a single vehicle pivoting around the non-steerable wheel means of said tractor upon turning movement of said steerable wheel means to facilitate accurate spotting of said trailer, said tractor having an overall length substantially less than the wheel base length of said trailer, said platform truck overlapping said tractor for approximately half the length of said tractor so that the two vehicles are very compact in a direction longitudinally thereof to facilitate ready maneuvering in narrow aisles.

2. In combination, an industrial tractor having steerable wheel means at the front end thereof and non-steerable wheel means at the rear end thereof, a trailer having fixed axis wheel means at one end thereof and caster wheel means at the opposite end thereof, coupling means detachably connecting the rear end of said tractor to said one end of said trailer, and means on said tractor supporting said fixed axis wheels off the floor so that said tractor and trailer operate as a single vehicle pivoting around the non-steerable wheel means of said tractor upon turning movement of said steerable wheel means to facilitate accurate spotting of said trailer, the non-steerable wheel means of said tractor being disposed in straddling relation to said supporting means, said tractor providing foot rest portions in flanking relation to the forward end of said trailer, said tractor having an overall length substantially less than the wheel base length of said trailer, said trailer overlapping said tractor for approximately half the length of said tractor so that the two vehicles are very compact in a direction longitudinally thereof to facilitate ready maneuvering in narrow aisles.

3. In combination, an industrial tractor having steerable wheel means at the front end thereof and non-steerable wheel means at the rear end thereof, a trailer having fixed axis wheel means at one end thereof and caster wheel means at the opposite end thereof, coupling means detachably connecting the rear end of said tractor to said one end of said trailer, and low level wheel rest portions on said tractor supporting said fixed axis wheels off the floor so that said tractor and trailer operate as a single vehicle pivoting around the non-steerable wheel means of said tractor upon turning movement of said steerable wheel means to facilitate accurate spotting of said trailer, said wheel rest portions being disposed below the axes of rotation of said fixed axis wheel means so that said fixed axis wheel means may move onto said rest portions when the trailer is shoved toward said tractor preparatory to coupling said trailer to said tractor.

4. An industrial tractor for hauling a trailer of the type having fixed axis wheel means at one end and caster wheel means at the other end, said tractor having a front end equipped with steerable wheel means, a rear end equipped with non-steerable wheel means, rearwardly facing coupling means on said tractor for connection to the fixed wheel end of a trailer of the type previously mentioned, means on the rear end of said tractor for supporting the fixed wheel end of such a trailer off the floor, said means being located between the non-steerable wheel means of said tractor and below the axes of rotation thereof, said supporting means being in the form of horizontal wheel rest platforms exposed at the rear end of said tractor, said tractor having an upright motor housing disposed solely on the front end of said tractor to leave the rear end clear for occupancy by the fixed wheel end of a trailer so that the two vehicles are compact in a longitudinal direction.

References Cited in the file of this patent

UNITED STATES PATENTS

| 707,950 | Steer | Aug. 26, 1902 |
| 722,262 | Stone | Mar. 10, 1903 |
| 2,111,983 | Massay | Mar. 22, 1938 |
| 2,114,156 | Towson | Apr. 12, 1938 |
| 2,475,825 | Dufour | July 12, 1949 |
| 2,669,314 | Quayle | Feb. 16, 1954 |
| 2,726,913 | Freeman | Dec. 13, 1955 |
| 2,735,253 | Huddle | Feb. 21, 1956 |

FOREIGN PATENTS

| 20,606 | Great Britain | of 1914 |

OTHER REFERENCES

Germany, C5375 II 63c, May 9, 1956.